United States Patent [19]

Casper et al.

[11] 4,144,286

[45] Mar. 13, 1979

[54] THERMOPLASTIC PVC RESIN COMPOSITIONS

[75] Inventors: Rudolf Casper; Wilfried Nolte, both of Leverkusen; Hans Braese, Cologne, all of Fed. Rep. of Germany

[73] Assignee: Bayer Aktiengesellschaft, Fed. Rep. of Germany

[21] Appl. No.: 780,128

[22] Filed: Mar. 22, 1977

[30] Foreign Application Priority Data

Mar. 27, 1976 [DE] Fed. Rep. of Germany ....... 2613121

[51] Int. Cl.² .................... C08L 51/00; C08L 53/00
[52] U.S. Cl. ............................................. 260/876 R
[58] Field of Search ................................. 260/876 R

[56] References Cited

U.S. PATENT DOCUMENTS

| | | | |
|---|---|---|---|
| 3,678,132 | 7/1972 | Isogawa et al. | 260/876 R |
| 4,041,106 | 8/1977 | Ide et al. | 260/876 R |

Primary Examiner—Richard B. Turer
Attorney, Agent, or Firm—Connolly and Hutz

[57] ABSTRACT

Thermoplastic moulding compositions of 20 to 90% by weight of polyvinyl chloride and, accordingly, 10 to 80% by weight of a mixture of (1) 20 to 100% by weight of a thermoplastic resin which is a copolymer of 30 to 40 parts by weight of α-methyl styrene, 52 to 62 parts by weight of methyl methacrylate and 4 to 14 parts by weight of acrylonitrile, and (2) 0 to 80% by weight of a graft polymer of 40 to 60 parts by weight of a monomer mixture of styrene (40 to 60 parts by weight), acrylonitrile (0 to 10 parts by weight) and methyl methacrylate (40 to 50 parts by weight), on 40 to 60 parts by weight of polybutadiene or butadiene/styrene copolymer containing up to 30% by weight of copolymerized styrene.

2 Claims, No Drawings

THERMOPLASTIC PVC RESIN COMPOSITIONS

This invention relates to transparent, high-impact vinyl chloride polymer moulding compositions. It is known that vinyl chloride polymers can be mixed with thermoplastic resins formed by the copolymerisation of α-methyl styrene, methyl methacrylate and acrylonitrile. Thermoplasticelastic graft copolymers, in which the graft base comprises butadiene-like polymers and the graft monomers are styrene, methyl methacrylate and, optionally, acrylonitrile, have been added as an additional component. Thermoplastic moulding compositions with favourable moulding properties, high impact strength and high thermal stability are obtained in this way (cf. DT-OS No. 2,010,633).

Unfortunately, these moulding compositions are not transparent.

It has now been found that, in addition to the favourable properties already present, the moulding compositions also become transparent when particular thermoplastic resins are chosen.

The present invention relates to thermoplastic moulding compositions of 20 to 90% by weight, preferably 40 to 70% by weight, of polyvinyl chloride and, accordingly, 10 to 80% by weight, preferably 30 to 60% by weight, of a mixture of (1) 20 to 100% by weight, preferably 40 to 70% by weight, of a thermoplastic resin which is a copolymer of 30 to 40 parts by weight of α-methyl styrene, 52 to 62 parts by weight of methyl methacrylate and 4 to 14 parts by weight of acrylonitrile, and (2) 0 to 80% by weight, preferably 30 to 60% by weight, of a graft polymer of 40 to 60 parts by weight of a monomer mixture of styrene (40 to 60 parts by weight), acrylonitrile (0 to 10 parts by weight) and methyl methacrylate (40 to 50 parts by weight), on 40 to 60 parts by weight of polybutadiene or butadiene-styrene copolymer containing up to 30% by weight of copolymerised styrene.

In addition to impact strength and dimensional stability under heat, these moulding compositions also are transparent. Surprisingly, transparency is only obtained when the thermoplastic resin has the quantitative composition indicated above.

The three components of the moulding composition are known in principle. The thermoplastic resins (1) are obtained by copolymerising the monomers in aqueous emulsion in the presence of radical initiators by methods known per se. The graft polymers are known, for example, from DT-OS No. 2,010,633. Polyvinyl chloride is a standard commercially manufactured plastic.

The moulding compositions can be produced from the components by mixing, for example in standard mixers (roll stand or internal mixer). They may contain the usual processing aids, such as stabilisers, lubricants, mould release agents and also pigments. They are used for the production of transparent high impact mouldings.

EXAMPLE (A) Production of the thermoplastic resins (1)

100 parts by weight of desalted water, 0.1 part by weight of emulsifier K 30 (sodium-n-alkyl sulphonate having 12 to 18 carbon atoms), 0.01 part by weight of disodium ethylene diamine tetraacetate and 10% by weight of the monomer mixture (in all 100 parts by weight with 0.1 part of tert.-dodecyl mercaptan; cf. Table 1) are introduced into a reaction vessel equipped with a stirrer, thermometer, reflux condenser, nitrogen inlet and dropping funnels. The oxygen in the reaction vessel is displaced by nitrogen and the temperature is increased to 65° C. Thereafter, 0.5 part by weight of potassium peroxodisulphate and 0.05 part by weight of triethanolamine, each dissolved in a little desalted water, are successively added. The rest of the monomer mixture and a solution of 2.5 parts by weight of the sodium salt of a disproportionated abietic acid, 1.5 parts by weight of N-sodium hydroxide and 0.45 part by weight of triethanolamine in 20 parts by weight of desalted water are then run in over a period of 4 hours. This is followed by stirring for 4 hours at 65° C.

The polymer is isolated from the resulting latex by precipitation with dilute acetic acid, filtration, washing and drying in vacuo.

(B) Production of the polyvinyl chloride mixtures

The quantities indicated in the Table (parts by weight) of polyvinyl chloride (PVC), terpolymer (A) and graft copolymer of 25 parts by weight of styrene, 22.5 parts by weight of methyl methacrylate and 2.5 parts by weight of acrylonitrile on 50 parts by weight of butadiene-styrene copolymer containing 30% by weight of styrene (MABS), are homogenised on a roll at 180° C. with 1.5 parts by weight of di-n-octyl tin dithioglycolic acid ester and 0.2 part by weight of polyethylene wax, followed by moulding into panels. The PVC used was a mass-produced product with a K-value of 58.

Examples 1 to 4 in Table 1 show monomer compositions according to the present invention with the favourable property combinations. Examples 5 to 8 are comparison Examples with momomer compositions outside the range of the invention and having distinctly inferior property combinations.

Table

| Example | | | | 1 | 2 | 3 | 4 | 5 | 6 | 7 | 8 |
|---|---|---|---|---|---|---|---|---|---|---|---|
| Monomer combination: | | | | | | | | | | | |
| α-methyl styrene | | | | 36.0 | 34.5 | 34.0 | 30.0 | 25.0 | 41.0 | 36.0 | 32.0 |
| methyl methacrylate | | | | 55.5 | 55.5 | 58.0 | 62.0 | 68.0 | 50.0 | 64.0 | 48.0 |
| acrylonitrile | | | | 8.5 | 10.0 | 8.0 | 8.0 | 7.0 | 9.0 | — | 20.0 |
| Properties of the mixtures | | | | | | | | | | | |
| PVC-terpolymer (A)-MABS | | | | | | | | | | | |
| 50 | 50 | — | notched impact strength[1] | 2.2 | 2.0 | 2.1 | 1.9 | 1.8 | 2.0 | 1.7 | 2.4 |
| | | | thermal stability under load[2] | 103 | 104 | 105 | 99 | 96 | 94 | 97 | 94 |
| | | | clouding[3] | 4.5 | 5.0 | 3.4 | 3.1 | 2.8 | 4.7 | 37.6 | 5.3 |
| 50 | 30 | 20 | notched impact strength | 10.5 | 10.0 | 10.8 | 9.1 | 8.3 | 5.5 | 1.4 | 7.4 |
| | | | thermal stability under load | 94 | 94 | 95 | 93 | 92 | 91 | 87 | 90 |

Table-continued

| Example | 1 | 2 | 3 | 4 | 5 | 6 | 7 | 8 |
|---|---|---|---|---|---|---|---|---|
| clouding | 5.4 | 5.7 | 6.8 | 11.4 | 19.5 | 19.8 | 30.7 | 16.7 |

[1] notched impact strength according to DIN 53 453
[2] thermal stability under load according to Vicat B, DIN 53 460
[3] scattered light component according to ASTM-method D 307
(PVC = 2.4 kpcm/cm$^2$)
(PVC = 78°C.)
(PVC = 2.5%)

We claim:

1. A thermoplastic moulding composition comprising 20 to 90% by weight of polyvinyl chloride and 10 to 80% by weight of a mixture of
   (1) 40 to 70% by weight of a thermoplastic resin which is a copolymer of 30 to 40 parts by weight of α-methyl styrene, 52 to 62 parts by weight of methyl methacrylate and 4 to 14 parts by weight of acrylonitrile, and
   (2) 30 to 60% by weight of a graft polymer of 40 to 60 parts by weight of monomer mixture of 40 to 60 parts by weight of styrene, 0 to 10 parts by weight of acrylonitrile and 40 to 50 parts by weight of methyl methacrylate grafted on 40 to 60 parts by weight of polybutadiene or a butadiene/sytrene copolymer containing up to 30% by weight of copolymerized styrene.

2. The thermoplastic moulding composition as claimed in claim 1 comprising 40 to 70% by weight of polyvinyl chloride and 30 to 60% by weight of the mixture of components (1) and (2).